Aug. 26, 1941.                R. A. SHAW                2,254,157
COLLAPSIBLE FABRIC PIPE FOR THE DISCHARGE OF LIQUIDS FROM AIRCRAFT
            Filed May 7, 1940           2 Sheets-Sheet 1

INVENTOR
Ronald Andrew Shaw
BY Pennie, Davis, Marvin & Edmonds
ATTORNEYS

Patented Aug. 26, 1941

2,254,157

UNITED STATES PATENT OFFICE 2,254,157

COLLAPSIBLE FABRIC PIPE FOR THE DISCHARGE OF LIQUIDS FROM AIRCRAFT

Ronald Andrew Shaw, Farnborough, England

Application May 7, 1940, Serial No. 333,763
In Great Britain November 5, 1938

5 Claims. (Cl. 244—137)

The primary object of this invention is to provide a form of collapsible pipe for the discharge of liquids from aircraft which, though normally stowed in a small space within the aircraft, can be released in flight when required and will trail steadily and steeply in the airstream and discharge liquids clear of the aircraft.

Collapsible fabric pipes which are formed of a single fabric tube on a spring foundation have already been tried in aircraft, but these suffer from the disadvantage that they tend not to run full of the liquid which they are discharging, and, in consequence, trail unsteadily in the airstream at a shallow angle and splash the aircraft with the liquid which they are discharging.

The invention consists in an improved form of collapsible fabric pipe comprising two fabric tubes of which one is disposed co-axially of and nested within the other so as to define an annular space, at least one tube, namely the inner tube, being mounted on a spring foundation, and means permitting the flow of liquid through the annular space so long as liquid is caused to flow through the inner tube, said means so restricting the flow of liquid through the outlet from the annular space as to maintain the annular space completely filled, whereby, when functioning, the pipe is appropriately weighted.

Desirably, the pipe incorporates two spring foundations, one for the inner tube and one for the outer tube.

Preferably, the upper ends of the tubes are separated by a perforated ring through which liquid is free to flow into the annular space and the lower ends of the tubes are united by shrinking the outer tube on to the inner tube. The total cross-sectional area of the perforations permitting entry of the liquid into the annular space is in excess of the area of the outlet at the lower end of the annular space so that, in operation, the annular space is maintained substantially filled with liquid.

Conveniently, the outlet of the annular space is constituted by eyelets formed in one of the tubes, preferably, the inner tube.

For extraction of air from the annular space, apertures may be formed in the inner tube in the region of the inlet end and in the path of the discharging liquid.

Figure 1:
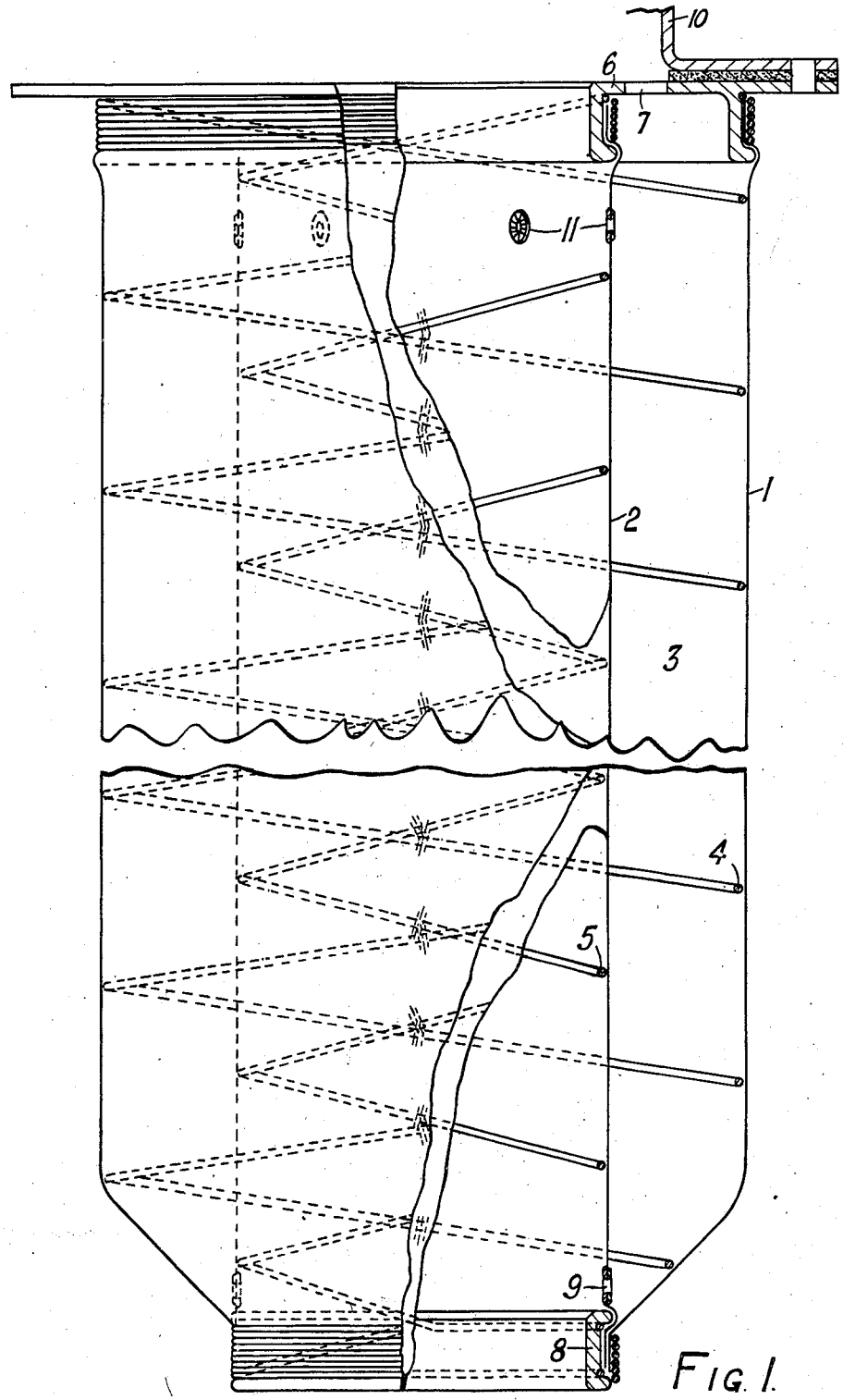
Figure 2:
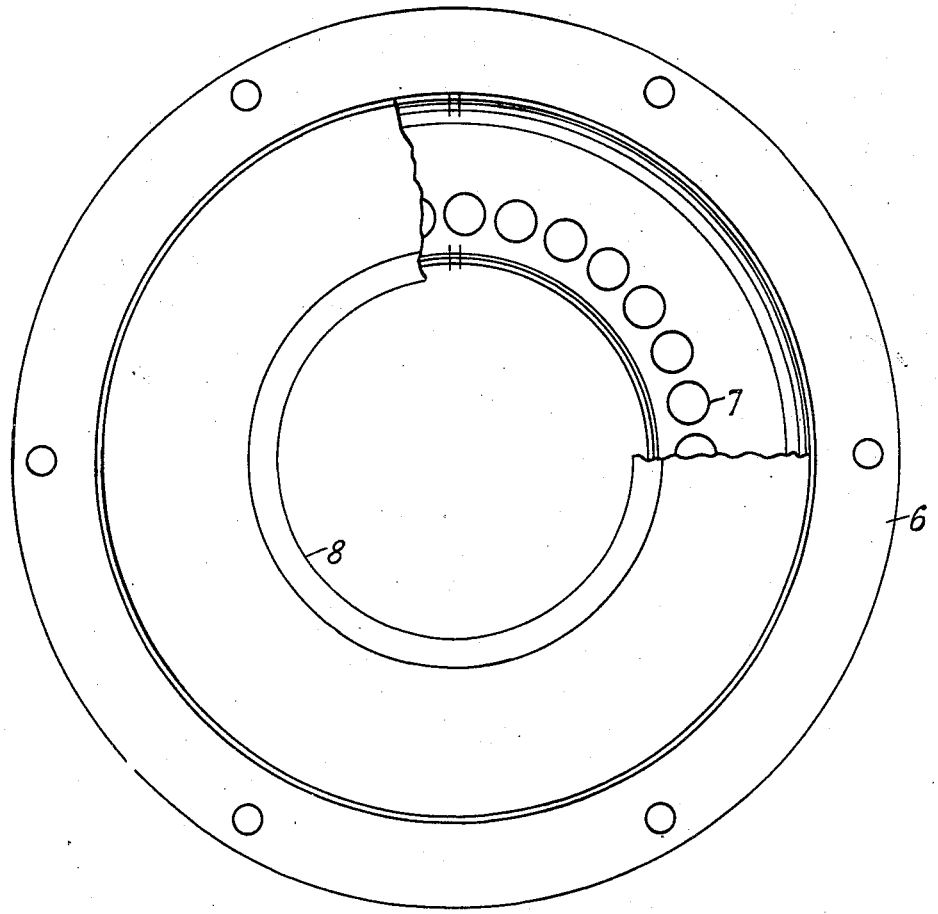

A preferred form of pipe according to the invention is illustrated by way of example in the accompanying drawings of which Fig. 1 is a part elevation part vertical section and Fig. 2 a part inverted plan part horizontal section.

The collapsible fabric pipe shown comprises an outer fabric tube 1 and an inner fabric tube 2 disposed co-axially of and nested within the tube 1 so as to define an annular space 3. The tubes are mounted respectively in spring foundations 4, 5. Means hereinafter described permit the flow of liquid through the annular space 3 so long as liquid is caused to flow through the inner tube and provision is made for restricting the flow of liquid through the outlet from the annular space so as to maintain the annular space completely filled, whereby, when functioning, the pipe is appropriately weighted.

The upper ends of the tubes 1, 2 are separated by a ring 6 having perforations 7 through which liquid is free to flow into the annular space 3, and the lower ends of the tubes are united by shrinking the tube 1 on to the tube 2 upon a ring 8. 9 denotes the outlet from the space 3.

The total cross-sectional area of the perforations 7 is in excess of the outlet area so that, in operation, the annular space is maintained substantially filled with liquid.

The outlet 9 is shown as constituted by eyelets formed in the inner tube. If desired, however, there may be employed a second perforated ring at the junction of the outer tube and the inner tube. The pipe is fitted at its upper end to the valve or orifice of the tank indicated conventionally at 10. Eyeletted apertures 11 formed in the tube 2 are so arranged in the path of the discharging liquid that any air in the space 3 is induced to flow through the apertures 11.

In operation, the pipe trails freely in the wind; the main discharge of liquid takes place through the tube 2, although there is a slight discharge also through the annular space 3 between the inner and outer pipes. As will be understood, the space 3 tends to remain full of the discharging liquid during the period of the discharge owing to the restriction imposed at the outlet. This has the effect of weighting the pipe which is thus caused to trail steadily and steeply in the airstream. When not in use, the pipe is normally compressed into a small fraction of its extended length and stowed in a suitable container under the tank on the aircraft.

The fabric used is preferably proofed in such a way as to be impervious to the liquid which is to be discharged, while not affecting adversely the storing qualities of the fabric. All metal parts of the pipe are preferably bonded to each other and to the rest of the aircraft.

What I claim is:

1. A collapsible pipe to trail below and to discharge liquid from an aircraft comprising an inner collapsible tube open at both ends for the passage of liquid therethrough, an outer collapsible tube surrounding and spaced from said inner tube, means attaching the lower end of said outer tube to the lower end of said inner tube to close the lower end of the space therebetween, said inner tube having an opening in its lower end establishing communication between said inner tube and the space between said tubes, and means providing a passage for conducting liquid into the upper end of the space between said tubes when liquid is flowing through said inner tube, the opening in the lower end of the inner tube being smaller than the passage into the upper end of the space between the tubes, whereby the space between said tubes remains filled with liquid during discharge of liquid through the inner tube.

2. A collapsible pipe as set forth in claim 1 including means for venting air from the upper end of the space between said tubes.

3. A collapsible pipe as set forth in claim 1 including means at the upper end of the inner tube forming an opening communicating with the space between the said tubes for venting air from the space into the inner tube.

4. A collapsible pipe as set forth in claim 1 including a helical spring positioned within each of said tubes to maintain the respective tubes distended.

5. A collapsible pipe to trail below and to discharge liquid from an aircraft comprising an inner fabric tube and an outer fabric tube surrounding and spaced from said inner tube, the lower end of said inner tube having an opening establishing communication between said inner tube and the space between said tubes, an open-centered ring embraced by said inner tube and presenting an outlet for liquid flowing through said tube, means attaching the lower end of said outer tube to the lower end of said inner tube to close the lower end of the space therebetween, helical springs, one within each of said tubes, serving to maintain the respective tube distended, and a centrally-apertured ring secured to the upper ends of said tubes, the central aperture of said last mentioned ring admitting liquid to the inner tube, said central-apertured ring having an opening admitting liquid to the space between said tubes, the cross-sectional area of the opening in said ring exceeding the cross-sectional area of the opening in the lower end of the inner tube.

RONALD ANDREW SHAW.